Jan. 26, 1960
A. P. DAVIS
2,922,228
GYRO COMPASS
Filed Sept. 2, 1944
2 Sheets-Sheet 1
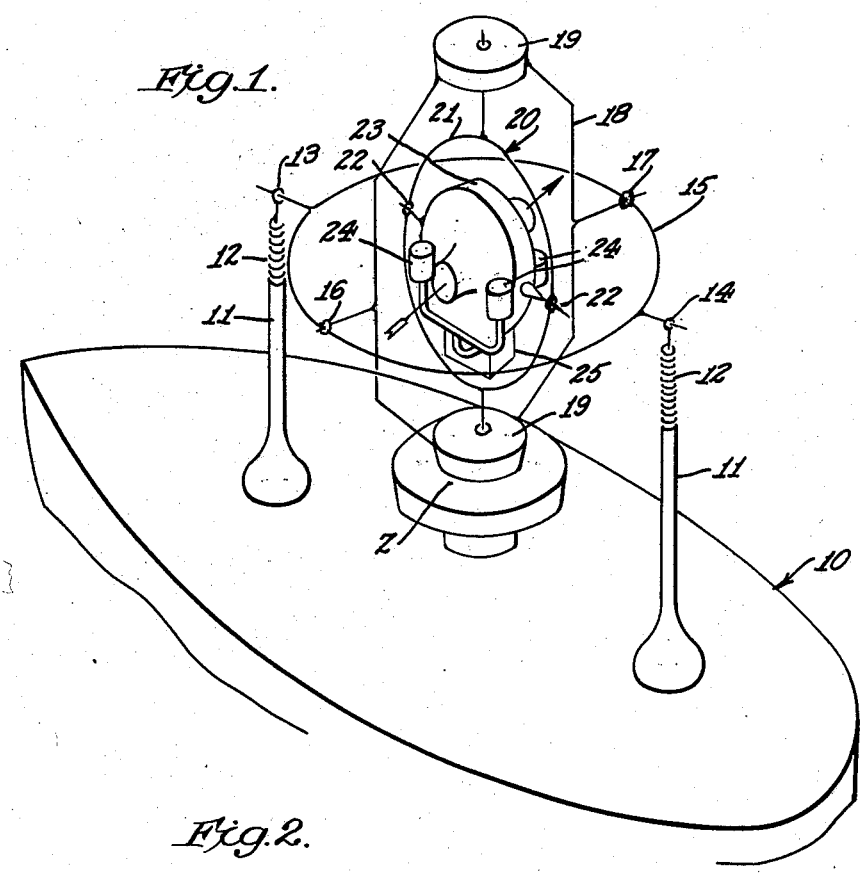
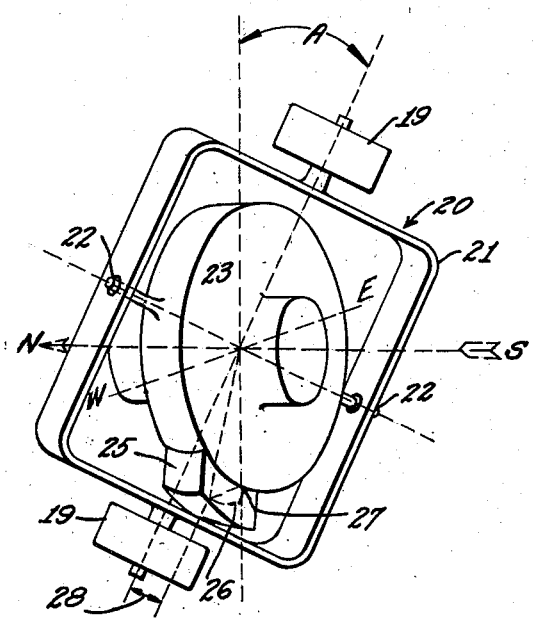
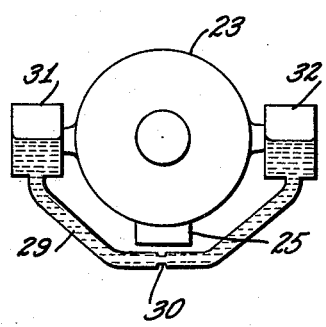
INVENTOR:
ARTHUR P. DAVIS
BY
Hoguet, Neavyr Campbell
ATTORNEYS Jan. 26, 1960

A. P. DAVIS 2,922,228

GYRO COMPASS

Filed Sept. 2, 1944

INVENTOR:
ARTHUR P. DAVIS
BY
Hogut, Feary & Campbell
ATTORNEYS

United States Patent Office 2,922,228
Patented Jan. 26, 1960

2,922,228
GYRO COMPASS

Arthur P. Davis, New York, N.Y., assignor to American Bosch Arma Corporation

Application September 2, 1944, Serial No. 552,438

4 Claims. (Cl. 33—226)

This invention relates to gyrocompasses, and has particular reference to an accurate gyrocompass for use on unstable platforms making rapid changes in speed and direction and hence subject to large angular tilts, such as motor boats, aircraft and other high speed vehicles, although the invention is not limited to that use.

As is now well understood, a free revolving gyroscope wheel, if weighted and so made pendulous, will turn toward the meridian, be carried beyond it, and return to oscillate across it indefinitely, and it is therefore customary to provide a damping apparatus in the form of interconnected liquid-filled tanks mounted North and South of the gyroscope case. The flow of liquid in the constricted pipe connecting the tanks, causes losses in the system which suppress gyroscope oscillations across the meridian, once it has been found.

In an earlier gyrocompass invented by applicant, the errors due to the movement of the ship are overcome by an arrangement involving the use of two gyroscopes, both acting to stabilize the sensitive element against tilting in the East-West plane, as well as to direct it North. Although this instrument is very successful for use on relatively stable ships, the East-West stabilization provided thereby is limited and imposes commensurate limitations on the instrument when used on very unstable, high speed, rapidly-maneuvered vehicles.

In accordance with the present invention, a gyrocompass is provided which overcomes the errors due to instability of the vehicle on which it is mounted, regardless of the degree of instability, the rapidity of change of tilt and the like, which is especially useful on very unstable, high speed, rapidly-maneuvered vehicles, although, because of its sensitivity and ruggedness, it is equally useful on more stable vehicles.

The preferred embodiment of the gyrocompass of this invention comprises a separately-levelled, pendulous, North-seeking gyroscopic element mounted in a gimbal suspension and provided with a unitary liquid damping system having the dual functions of meridional stabilization and gravity and acceleration stabilization with the same body of liquid flowing both parallel and perpendicular to the axis of the gyroscope wheel through corresponding constricted passages, whereby the error-causing tendencies of both gravity and acceleration effects are nullified by a simple, rugged, and compact system operative under the most sudden and violent rolling, speed and direction changes.

For a more complete understanding of the invention, reference may be had to the accompanying drawings, in which:

Figure 1 is a perspective view of the general arrangement of one form of the gyrocompass of this invention;

Fig. 2 is a perspective view showing the sensitive element of the system of Fig. 1 after having rolled over in an inter-cardinal plane, and illustrates the correcting action of the invention;

Fig. 3 is a diagrammatic view of the gyroscope of the sensitive element with one set of its ballast and damping tanks;

Figure 4:
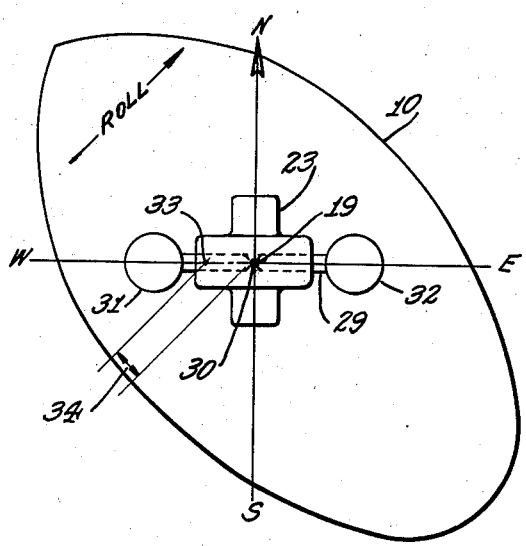
Fig. 4 is a schematic plan view of a ship provided with the gyrocompass of this invention, and illustrates its action.

Referring to the drawings, Fig. 1 illustrates a preferred form of the gyrocompass of this invention, shown as mounted on an unstable platform, such as a ship 10, by means of pedestals 11, including springs 12, which may be provided with damping means, not shown. Pivoted fore and aft at 13 and 14 on pedestals 11 is a gimbal ring 15, providing port and starboard pivots 16 and 17, in which the stabilized frame 18 is suspended. Frame 18 is thus universally supported and is substantially free from the influence of the rolling and pitching of the ship 10 by reason of the stabilizing action of zenith gyroscope Z. Preferably gyroscope Z is mounted at the lower end of frame 18 as shown, but it may be mounted on any other part of the frame 18, or may be separately mounted in gimbals and stabilize the frame 18 through connecting rods or motor drives, all of which is well understood.

A sensitive azimuth or directive unit 20 is mounted for rotation about a substantially vertical axis in free bearings, such as mercury float bearings 19 provided at the top and bottom of frame 18. This sensitive unit 20 comprises a gyroscope 23, rendered pendulous by weight 25, mounted on free horizontal bearings 22 in the vertical ring 21, and carries on its casing a set of damping tanks 24, which are interconnected in a special manner to be described.

Fig. 2 illustrates, in greatly exaggerated form, the conditions which are encountered when the stabilized directive unit 20 has developed a tilt in an inter-cardinal plane, due to a prolonged acceleration, for example. The plane of the drawing represents the inter-cardinal plane in which the tilt is supposed to have occurred, and the large arrow through the axle of the gyroscope 23 is represented as pointing North, downwardly to the left into the plane of the drawing. It will be observed that the upper bearing 19 of the system has rolled over toward the South-East through an angle A, and inasmuch as the gyroscope axle lies in the North-South plane, the frame 21 is represented as projecting forwardly out of the plane of the drawing at the left and behind it at the right.

This swing of frame 21 about the tilted axis of the bearings 19, also results in a tilt of bearings 22, as shown. Under such conditions, the center of gravity of the pendulous weight 25 no longer lies directly below the gyroscope axle, but has swung through an arc 26 in the central plane of the gyro wheel and thus has been raised a distance 27 projected. At the same time, the center of gravity of weight 25 has been moved a distance 28 away from the axis of the bearings 19, in a plane containing that axis and the axle of the gyroscope 23, that is, in a North-South plane tilted out of the vertical.

Under these conditions, it is evident that the component of gravity, parallel to line 22—22 and tangent to arc 26, with the moment arm 28, will produce a torque about the axis of bearings 19 which, if persistent, will cause error in compass heading. This is, of course, a simple gravity effect rather than one due to acceleration, and would not appear if the gyro 23 were not pendulous, but in that case, the gyroscope would not have the desired North-seeking action. However, if the gyroscope 23 could be made effectively pendulous only in the North-South plane, this gravity error would not appear, and the compass would be unaffected by expected errors in stabilization. The gyrocompass of the present invention accomplishes this desirable effect by the mechanism now to be described.

Fig. 3 illustrates the gyroscope 23 with its pendulous weight 25, and a pair of ballast tanks 31 and 32 containing a suitable damping liquid such as oil, inter-connected by a pipe 29 having a constriction 30 therein, all mounted on the casing 23 in the plane of the gyroscope wheel. As is well known, this arrangement acts like an inverted pendulum, and in this case the tanks 31 and 32 are so proportioned that when the liquid in the two tanks is at the same level, the righting moment in the East-West plane produced by the weight 25 is exactly cancelled. However, the weight 25 continues to act in the North-South pane, thus maintaining the meridian-seeking properties of the system. The purpose of the constriction 30 in the pipe 29 will be explained in the following discussion of acceleration effects in such a system.

The balancing system in Fig. 3 is obviously subject to disturbance by accelerations due to rolling of the ship, the liquid accumulating more in one tank than the other. If this liquid accumulation in one tank is left uncontrolled, unbalancing the gyroscope in the East-West plane results, again subjecting it to gravity with the aforementioned consequent error. In order to prevent this error, the constriction 30 in the pipe is proportioned to just such size that the liquid flow will be caused to lag approximately one-quarter of a cycle behind the causative acceleration, so as to introduce a phase difference into the system, which, during a complete roll period or cycle, produces the following effects: When the disturbing acceleration is a maximum, the liquid surfaces in the two tanks will be level; when the acceleration is zero, the liquid surfaces will have their greatest differences in head, thus insuring that the flow of liquid occurs one-quarter cycle, in phase, behind the causative acceleration pressure. At the same time, the constriction 30 will not be sufficiently restrictive to preclude levelling of the liquid between both tanks 31 and 32 under the influence of gravity, if the conditions of Fig. 2 persist. With a stability of not more than one degree of departure from the vertical provided by the zenith gyroscope Z, this relation of constriction and tank volume successfully prevents any appreciable deviation of the gyroscope axle indication from the North.

Operation of the above-described portion of the gyrocompass of this invention may be readily understood by reference to Fig. 4, schematically illustrating the compass and its mount on shipboard as seen from above. Assume that the ship 10 is proceeding on a North-Westerly, that is, an inter-cardinal course, and that the compass 23 is mounted above the center of roll of the ship, so that it is subject to forces due to sidewise components of the rolling motion. Such horizontal forces, due to acceleration, will exhibit the following values: At the center of the roll the acceleration force will be zero, while at each end of the roll the force will be maximum, because the change in speed is maximum and the acceleration direction will be toward the center of the ship. If the ship is rolling to starboard, as shown by the arrow marked "Roll," and bearing in mind that the tanks 31 and 32 are maintained substantially level by the stable zenith Z, liquid will tend to be driven from tank 31 to tank 32 because the roll is slackening.

On the other hand, when the roll is in the opposite direction, the liquid will tend to be driven from tank 32 to tank 31 for the same reason. However, because of the restriction imposed on the liquid flow by the constriction 30, a lag of approximately ninety degrees is produced, so that at each end of the roll, the level of the two tanks will be the same, whereas when passing the center of the roll the tanks will have their maximum differences in level. Thus, in passing from the port to the starboard half of the roll, tank 32 will have its minimum head as the roll posses through level position, resulting in a shift of the center of gravity of the gyroscope 23 in an East-West direction. Thus, in rolling from port to starboard, the center of gravity of the system, at a certain instant, might be shifted to a point 33, and there be acted on by the same acceleration forces to produce a torque impulse about the axis of bearings 19, using the moment arm 34.

Considering a whole cycle of roll, the liquid level will be the same in both tanks at the extreme of the roll to port, but the effective center of gravity of the gyro system will be that of the gyroscope proper, and hence there will be no moment arm. As the ship recovers from extreme port roll toward even keel, the effective moment arm 34 will increase to a maximum and the acceleration of point 33 will decrease from maximum to zero, its direction being to starboard, thus setting up a torque couple counter-clockwise about the bearings 19. Similarly, as the roll proceeds from even keel to maximum starboard roll, the acceleration will change direction and increase from zero to maximum, driving the liquid from tank 31 to tank 32, resulting in a decrease of arm 34 from maximum to zero. Although this arm is on the same side of center as during the first quarter of the roll discussed above, the direction of the acceleration has reversed, resulting in a clockwise torque about the bearings 19. Accordingly, this torque reversal as the ship passes even keel, completely nullifies the effects of the counter-clockwise torque developed on the roll from extreme port to even keel. Similarly, during a roll from extreme starboard back to even keel, the torque is counter-clockwise, and from even keel back to extreme port, it is clockwise.

It will be seen that with this arrangement of liquid tanks, the disturbing forces on an inter-cardinal course are not cumulative but balanced out over a period of time and the compass heading is substantially unaffected. The invention thus enables practical use of a pendulous gyroscope, with separate stabilization, as a compass, thus controlling the tendency of both gravity and acceleration effects to cause an error in heading, which is especially evident in inter-cardinal sailing and in violent rolling.

It will be understood that the liquid correcting system described is an adjunct to the usual liquid damping system of a pendulous gyroscope used for damping oscillations of the gyroscope across the meridian. Inasmuch as two separate liquid systems with their tanks and pipes result in a bulky and heavy assembly in many instances, applicant has devised a way of combining the two systems into one. Notwithstanding that both systems have entirely different functions, the single unit of this invention provides complete effectiveness for each and each acts independently of the other, while at the same time the bulk of the dual system is greatly reduced.

Figure 5:
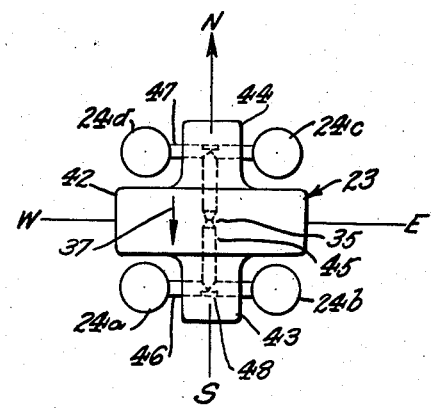
Fig. 5 shows a damping tank arrangement for correcting errors in the system of this invention.

This dual system, as seen from above in Fig. 5, includes, firstly, the pair of tanks 24a and 24b mounted on the gyroscope 23, connected together and to one end of the pipe 45, and the opposite pair of tanks 24c and 24d also connected together and to the opposite end of pipe 45; secondly, the tank 24a, pipe 46 and tank 24b; and thirdly, the tank 24d, pipe 47 and tank 24c. Thus, although there appear to be three systems, they act as two systems, namely, the meridian damping system through pipe 45, and a second double system with parallel pipes 46 and 47.

These damping tanks 24a, 24b, 24c and 24d, which, according to this invention take the place of the theoretical tanks 31 and 32 of the diagrams of Figs. 3 and 4, are inserted in the spaces provided between the casing 42 and the protruding bearing mounts 43 and 44. This sample arrangement not only makes a very compact assembly but, by combining the two damping systems, the bulk is reduced to about seven-tenths and the total amount of damping liquid, such as oil, is reduced to one-half of that which would be required for two separate systems. The compactness thus provided is obviously very advantageous, particularly for military installations where space is at a premium.

Figure 6:
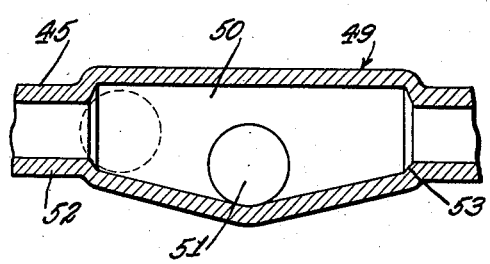
Fig. 6 is an enlarged section through the damping controller of this invention, and used for damping high transient accelerations.

In addition to the various usual disturbances, the gyroscope is subject to the disturbing effects which occur when the highly maneuverable motor boat or aircraft on which it may be mounted makes a quick turn, or makes a considerable change in speed. Such a change, due to its acceleration component in the North-South direction, acts on the liquid itself and causes it to be transferred from one tank group to the other through the pipe 45. In order to prevent excessive flow of the liquid under these conditions, with resultant serious unbalance, the gravity-operated valve illustrated in Fig. 6 is inserted in any or all of the pipes 45, 46, 47. Assuming, for example, that pipe 45 is so arranged, it is provided with an enlarged portion 49 providing a cavity 50 containing a check ball 51, shown in full lines as normally lying at the bottom of a double ramp, but capable of rolling to either side, for instance to the lefthand side into the position shown in dotted lines under the same influence of acceleration which caused the liquid to flow. In this position it engages the spherical seat 52 provided in the entrance to the pipe 45, thus cutting off any further transfer of the liquid to the left. A similar action takes place when the ball 51 rolls to the right to engage seat 53, should the acceleration force be in that direction.

In either case, upon diminution of the acceleration the ball 51 returns by gravity to its normal center position shown in solid lines, thus again permitting free flow of liquid through pipe 45. It will be observed that a ball so poised is also under the influence of gravity and therefore the angles of the ramps each side of the vertical of the gyro assembly should be sufficiently less than 90° to prevent the ball from rolling toward valve-closing position under the influence of gravity for any expected tilt of the assembly. This will insure operation of the ball cut-off only by large transient acceleration instead of by gravity.

Figure 7:
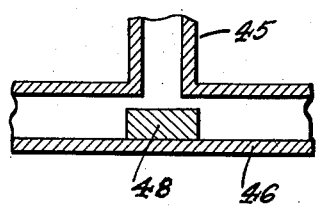
Fig. 7 is an enlarged section through a special form of pipe constriction used in the invention.

Fig. 7 illustrates a junction in the pipe system of the liquid flow network, such as the junction between pipes 45 and 46, provided with a constriction in the form of a block 48 welded or otherwise secured to the inner surface of pipe 46. The junction between pipes 45 and 47 is provided with a similar flow-constricting block for the same purpose. By this means each of the lateral pipes 46 and 47 will have one constricted passage, and the connecting pipe 45 will have its own constriction 35, as shown in Fig. 5, this latter constriction being understood to be the means of damping gyro oscillation about the meridian. By this novel means the compound damping and balancing system is properly proportioned to perform its dual function.

Although a preferred embodiment of the invention has been illustrated and described herein, it is to be understood that the invention is not limited thereby but is susceptible of changes in form and detail within the scope of the appended claims.

I claim:

1. In a gyrocompass, the combination of a universally-supported North-seeking gyroscopic element, means rendering said element pendulous, means for stabilizing said element against instability of its support, gravity means including a movable mass, guide means confining the movement of said mass in an East-West plane relatively to said element in response to a tilt of said element for introducing a torque in opposition to the gravity righting couple produced by the pendulous means thereon in said plane, and means for retarding the movement of said gravity means by an amount approximately equal to one-fourth of a cycle of the tilt-causing acceleration, whereby said element remains pendulous only in the North-South plane.

2. In a gyrocompass, the combination of a universally-supported North-seeking gyroscopic element, means rendering said element pendulous, means for stabilizing said element against instability of its support, and gravity means including a movable mass, guide means confining the movement of said mass in an East-West plane relatively to said element in response to a tilt of said element for introducing a torque in opposition to the gravity righting couple produced by the pendulous means thereon in said plane, said gravity means comprising spaced liquid-containing tanks mounted symmetrically on the casing of said gyroscope in said plane and connected by a conduit having a constriction therein for retarding the flow of liquid from one tank to another, whereby said element remains pendulous only in the North-South plane.

3. In a gyrocompass, the combination of a universally-supported North-seeking gyroscopic element, means rendering said element pendulous, means for stabilizing said element against instability of its support, and gravity means including a movable mass, guide means confining the movement of said mass in an East-West plane relatively to said element in response to a tilt of said element for introducing a torque in opposition to the gravity righting couple produced by the pendulous means thereon in said plane, said gravity means comprising spaced liquid-containing tanks mounted symmetrically on the casing of said gyroscope in said plane and connected by a conduit, whereby said element remains pendulous only in the North-South plane, said conduit containing a normally open valve responsive to a strong transient acceleration causing an excessive tilt of said gyroscope in said plane for temporarily closing said conduit and stopping the liquid flow therein during said acceleration.

4. In a gyrocompass, the combination of a universally-supported pendulous North-seeking gyroscopic element, means for stabilizing said element against instability of its support, and gravity means movable only in an East-West plane relatively to said element in response to a tilt of said element for introducing a gravity righting couple thereon in said plane, and holding means for said gravity means comprising spaced liquid-containing tanks mounted symmetrically on the casing of said gyroscope in said plane and connected by a conduit containing a constriction retarding the flow of liquid between said tanks by an amount approximately equal to one-fourth of a cycle of the tilt-causing acceleration, whereby said element remains pendulous only in the North-South plane.

References Cited in the file of this patent

UNITED STATES PATENTS

| 1,425,056 | Rossiter | Aug. 8, 1922 |
| 1,445,279 | Henderson | Feb. 13, 1923 |
| 1,497,660 | Henderson | June 10, 1924 |
| 1,687,970 | Corliss | Oct. 16, 1928 |
| 1,765,548 | Tanner | June 24, 1930 |
| 1,811,415 | Harris | June 23, 1931 |

OTHER REFERENCES

Rawlings: "The Theory of the Gyroscopic Compass," 2nd edition, published by Macmillan Co., N.Y., March 1944. Copy in Div. 62. (182 pp. Note pp. 40–42, 64–73, and 82–92.)